May 16, 1967  J. R. TURK  3,320,448
MAGNETIC COUPLING FOR ELECTRIC MOTOR
Filed Feb. 26, 1964
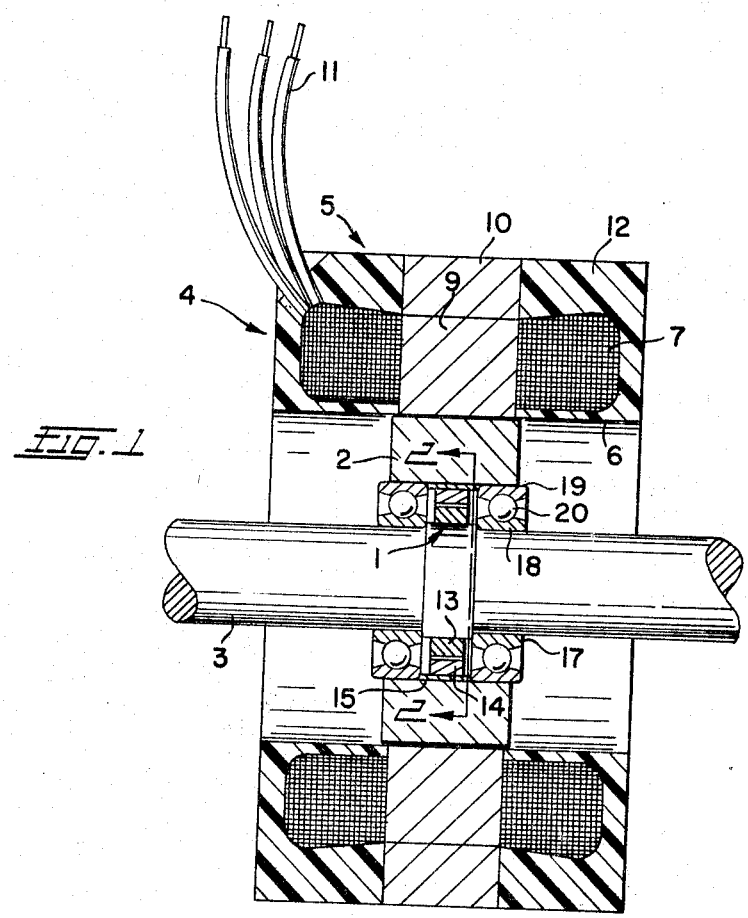
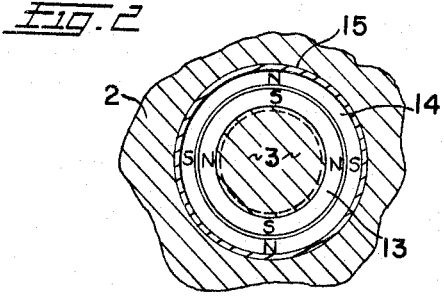
INVENTOR.
JAMES R. TURK
BY
Oberlin, Maky & Donnelly
ATTORNEYS United States Patent Office 3,320,448
Patented May 16, 1967

3,320,448
MAGNETIC COUPLING FOR ELECTRIC MOTOR
James R. Turk, Wickliffe, Ohio, assignor to Vincent K. Smith, Gates Mills, Ohio
Filed Feb. 26, 1964, Ser. No. 347,482
18 Claims. (Cl. 310—98)

The present invention relates generally, as indicated, to a magnetic coupling for an electric motor and, more particularly, to an electric motor having a magnetic coupling which will automatically allow the output shaft of the motor to come to a complete standstill when the pull-out torque of such motor is exceeded.

In a conventional hysteresis motor of the type having a secondary core of hardened magnet steel or cobalt, the secondary hysteresis loss induced in the secondary core by the revolving field of the primary produces effective synchronous motor action. Such a hysteresis motor gives substantially the same torque from standstill all the way up to synchronous speed.

When the load torque exceeds the maximum hysteresis torque, the secondary magnetization axis slips on the rotor, giving the same effect as a friction brake set for a fixed torque. However, in some applications it is highly desirable that the output shaft stop once the torque of the motor is exceeded, rather than continue rotating at decreased speed, since the slipping action generates a great deal of heat which may either cause damage to the windings of the motor or even burn the motor out.

Moreover, such stoppage is a positive indication that the torque demand is in fact exceeding the maximum output torque of the motor, and would require remedial action to be taken before the motor could again drive the driven member.

It is therefore a principal object of this invention to provide a conventional hysteresis motor and the like with a novel means for allowing the output shaft thereof to come to a standstill once the pull-out torque of the motor is exceeded.

It is another object to provide a magnetic coupling between the rotor and rotor or output shaft of an electric motor for limiting the torque exerted by such motor on a driven member.

Still another object is to provide such a magnetic coupling for an electric motor which will allow the rotor to rotate at synchronous speed and allow the motor shaft to come to a standstill after a torque demand greater than the pull-out torque of the motor is applied to the motor shaft.

Yet another object is to provide a magnetic coupling between a rotor and rotor shaft of an electric motor which when uncoupled can be recoupled only by bringing the opposite poles of the magnetic rings of such coupling into alignment.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail a certain illustrative embodiment of the invention, this being indicative however, of but one of the various ways in which the principle of the invention may be employed.

In said annexed drawing:

FIG. 1 is a central longitudinal cross-section through a conventional hysteresis motor and the like embodying a preferred form of novel magnetic coupling in accordance with the present invention; and FIG. 2 is a fragmentary vertical section taken on the plane of the line 2—2 of FIG. 1.

Referring now in detail to the drawing, there is illustrated in FIG. 1 by way of example a magnetic coupling 1 disposed between the rotor 2 and rotor or output shaft 3 of a conventional hysteresis motor 4. However, it should be understood that the use of such a magnetic coupling is not limited to hysteresis motors; but, rather, has general application with almost all types of electric motors. The hysteresis motor 4 includes a stator assembly 5 having a cylindrical bore 6 in which there is mounted the rotor 2, such rotor preferably being made of cobalt.

The stator assembly 5 may be of any well-known construction, but it is desirable that such assembly be constructed in accordance with the teachings of the Vincent K. Smith Patent No. 2,565,530, dated Aug. 28, 1951, in which there is disclosed a stator assembly formed by winding stator windings 7 into exterior and axially extending slots of a stack of spider laminations 9 and subsequently heat shrinking a stack of yoke laminations 10 upon the stack of spider laminations.

Extending from the stator assembly 5 there are a plurality of stator leads 11 for connection to an external power source, not shown.

The space within the slots of the spider laminations 9 not occupied by the windings 6 are filled with an epoxy coating resin 12 while the end loops of such windings are potted in the casting resin 12 in any well-known manner, as, for example, by placing the assembly in a mold (not shown) under a vacuum of 28–29" Hg and pouring the resin the mold.

The rotor 2 and rotor shaft 3 are concentrically mounted within the stator bore 6 for rotational movement by means of suitable journal bearings, also not shown, supporting the rotor shaft.

As aforesaid, disposed between the rotor and rotor shaft there is a magnetic coupling 1. Such coupling consists of an inner magnetic ring 13 securely mounted on the rotor or output shaft 3 as by a press fit and an outer magnetic ring 14 concentrically disposed about such inner magnetic ring and secured to the inner surface of a non-magnetic steel sleeve 15, such sleeve being retained in the bore of the cobalt rotor 2 by frictional engagement therewith.

Also mounted in the bore of the rotor 2 adjacent either side of the magnetic rings 13 and 14 are precision ball bearings 17, the inner races 18 of which frictionally engage the rotor shaft 3 and the outer races 19 of which are secured to the rotor 2. Preferably, such ball bearings 17 are further held in place by a suitable adhesive, such as Loctite, for example.

The magnetic rings 13 and 14 are made from a permanent ferromagnetic material, such as high-coercive force ceramic magnets, which has been magnetized to form multiple magnetic poles (see FIG. 2). While the number of poles may be varied as desired, it has been found that four poles equally spaced around the circumference of the magnetic rings are sufficient to achieve the desired results which will be fully discussed hereafter.

Such magnetic rings 13 and 14 are capable of transmitting a torque when the opposite poles are aligned; i.e., when the north poles of ring 13 are aligned with the south poles of ring 14 and vice versa, in the manner shown in FIG. 2. The maximum value of this torque will vary, depending upon a number of different factors, such as the particular ferromagnetic material from which the magnetic rings 13 and 14 are made, the mean torque arm, the axial length of the magnetic rings, the number of magnetic poles in each ring, and the air gap length between the rings.

In operation, the opposite poles of the inner and outer magnetic rings 13 and 14, respectively, are initially aligned as aforesaid. When current is supplied to the windings 7 of the motor 4, a revolving magnetic field is created in the stator assembly 5, the hysteresis losses from which are induced into the rotor 2 to cause the same to start rotating and increase its rotational speed until such rotor reaches synchronous speed.

Since the outer magnetic ring 14 is secured to the rotor 2 for rotational movement therewith, the rotation of the rotor will be transferred through the magnetic coupling 1 to the rotor shaft 3 to cause such shaft to rotate in unison with the rotor. However, should the torque demand on the rotor shaft 3 exceed the magnetic coupling torque of the magnetic coupling 1, the magnetic rings 13 and 14 will uncouple and thus become out of step with each other. When so uncoupled, practically no torque will be transmitted through the magnetic coupling 1 since during relative rotation of the magnetic rings 13 and 14 there is transmitted alternately equal attractive and repelling forces, the effective or net torque of which is zero. There no longer being an effective coupling between the rotor 2 and rotor shaft 3, the shaft 3 will be allowed to come to a complete standstill while the rotor 2 continues to rotate about such shaft on the balls 20 of precision bearings 17 at synchronous speed.

Generally, it is desired that the maximum magnetic coupling torque created between the two magnetic rings 13 and 14 be slightly below the pull-out torque of the rotor with which it is associated, which in this case is 20 in. oz., to act as a positive indication that the pull-out torque has been exceeded. This feature is important in applications where the motor drives machinery for continuous processing of filaments such as fiber glass, nylon, etc., since subsynchronous speed causes other problems to arise in the continuous manufacturing process. However, should it be desired to limit or set the amount of torque transmitted to the driven member by the rotor shaft 3, the magnetic coupling 1 can, of course, be selected as desired to have a coupling torque of any value so long as the torque does not exceed the pull-out torque of the motor.

To restart the output shaft 3, it is necessary to once again bring the opposite poles of the two magnetic rings 13 and 14 into alignment, which can only be done by eliminating the relative movement between the two rings, as by turning off the motor and allowing the rotor 2 and outer magnetic ring 14 to come to a halt. Only when the poles are aligned is there again created an effective magnetic coupling torque which tends to maintain the relative positions of the rotor and rotor shaft 3.

Other modes of applying the principles of the invention may be employed, change being made as regards the details described, provided the features stated in any of the following claims or the equivalent of such be employed.

I, therefore, particularly point out and distinctly claim as my invention:

1. For use in a hysteresis motor of the type including a stator assembly having a bore, and a rotor and rotor shaft concentrically disposed within said bore; magnetic coupling means disposed between said rotor and rotor shaft operative to cause said rotor shaft to rotate in unison with said rotor and transmit a predetermined amount of torque from said rotor to said rotor shaft, said magnetic coupling means also being operative when the torque demand on said rotor shaft exceeds said predetermined amount of torque to allow said shaft to come to a stop while said rotor continues to rotate.

2. The hysteresis motor of claim 1 wherein said magnetic coupling means includes an inner magnetic ring securely mounted on said rotor shaft, and an outer magnetic ring concentrically disposed about said inner magnetic ring and secured in the bore of said rotor.

3. The hysteresis motor of claim 2 further including a non-magnetic steel sleeve retained in said rotor bore, the inner surface of which is in engagement with and secured to the outer surface of said outer magnetic ring.

4. The hysteresis motor of claim 1 further including at least one precision ball bearing mounted in said rotor bore disposed axially adjacent said magnetic coupling means, said precision ball bearing having an inner race secured to said rotor shaft, an outer race secured to said rotor, and precision balls disposed between said races, said rotor being adapted to continue to rotate about said rotor shaft on the balls of said bearing when said shaft is allowed to come to a stop.

5. The hysteresis motor of claim 4 wherein there are two of said precision ball bearings, one disposed adjacent each side of said magnetic coupling means.

6. The hysteresis motor of claim 1, wherein said predetermined amount of torque is less than the pull-out torque of said rotor.

7. The hysteresis motor of claim 1, wherein said predetermined amount of torque is substantially equal to the pull-out torque of said rotor.

8. The hysteresis motor of claim 2, wherein said inner and outer magnetic rings have multiple magnetic poles.

9. The hysteresis motor of claim 2, wherein said inner and outer magnetic rings have four magnetic poles equally spaced around their respective circumferences.

10. In an electric motor of the type having a stator assembly, and a rotor and output shaft concentrically disposed within a bore in said stator assembly; means mounting said output shaft and rotor for relative rotational movement with respect to each other; means operative to maintain the relative positions of said rotor and output shaft when said rotor is rotated and transmit a predetermined amount of torque during such rotation from said rotor to said output shaft only so long as the torque demand on said output shaft does not exceed said predetermined amount of torque, said means also being operative to allow said output shaft to come to a complete standstill during continued rotation of said rotor and eliminate torque transmittal between said rotor and output shaft in response to the torque demand exceeding such predetermined amount of torque.

11. The electric motor of claim 10, wherein said predetermined amount of torque is less than the pull-out torque of said rotor.

12. In an electric motor of the type having a stator assembly, and a rotor and output shaft concentrically disposed within a bore in said stator assembly; means operative to maintain the relative positions of said rotor and output shaft when said rotor is rotated and transmit a predetermined amount of torque during such rotation from said rotor to said rotor shaft only so long as the torque demand on said output shaft does not exceed said predetermined amount of torque, said means also being operative to allow said output shaft to come to a complete standstill and eliminate torque transmittal between said rotor and output shaft when said torque demand exceeds said predetermined amount of torque regardless of the rotational speed of said rotor, said predetermined amount of torque being substantially equal to the pull-out torque of said rotor.

13. The electric motor of claim 10, wherein said means includes a magnetic coupling disposed between said rotor and output shaft, and at least one ball bearing disposed axially adjacent said magnetic coupling, said magnetic coupling comprising an inner magnetic ring securely mounted on said output shaft and an outer magnetic ring concentrically disposed about said inner magnetic ring and secured to said rotor, said ball bearing including an inner race mounted on said output shaft, an outer race secured to said rotor, and precision balls disposed between said inner and outer races.

14. The electric motor of claim 13, wherein said magnetic rings have multiple magnetic poles which are adapted to transmit said predetermined amount of torque only when the opposite poles are aligned.

15. An electric motor comprising a stator assembly having a bore, a rotor and rotor shaft concentrically disposed in said stator bore for rotational movement, magnetic coupling means disposed between said rotor and rotor shaft operative to cause said rotor shaft to rotate in unison with said rotor and transmit a predetermined amount of torque from said rotor to said rotor shaft only so long as the torque demand on said rotor shaft does not exceed said predetermined amount of torque, said magnetic coupling means also being operative to allow said rotor shaft to come to a stop and remain stationary while said rotor rotates when the torque demand on said rotor shaft exceeds said predetermined amount, and bearing means disposed between said rotor and rotor shaft operative to support said rotor and rotor shaft for relative rotational movement.

16. The electric motor of claim 15 wherein said magnetic coupling means includes an inner magnetic ring securely mounted on said rotor shaft, and an outer magnetic ring concentrically disposed about said inner magnetic ring and secured in the bore of said rotor.

17. The electric motor of claim 16 further including a non-magnetic steel sleeve retained in said rotor bore, the inner surface of which is in engagement with and secured to the outer surface of said outer magnetic ring.

18. The electric motor of claim 17 further including at least one precision ball bearing mounted in said rotor bore disposed axially adjacent said magnetic coupling means, said precision ball bearing having an inner race secured to said rotor shaft, an outer race secured to said rotor, and precision balls disposed between said races, said rotor being adapted to continue to rotate about said rotor shaft on the balls of said bearing when said shaft is allowed to come to a stop.

References Cited by the Examiner
UNITED STATES PATENTS

| | | | |
|---|---|---|---|
| 2,795,711 | 6/1957 | Miller | 310—92 X |
| 3,195,035 | 7/1965 | Sudmeier | 310—98 X |
| 3,267,309 | 8/1966 | Cohen | 310—98 |

MILTON O. HIRSHFIELD, *Primary Examiner.*

DAVID X. SLINEY, *Examiner.*